May 3, 1960  K. ATKINSON  2,935,125
WELDING AND CUTTING TORCH COMBINATION
Filed May 2, 1957  2 Sheets-Sheet 1
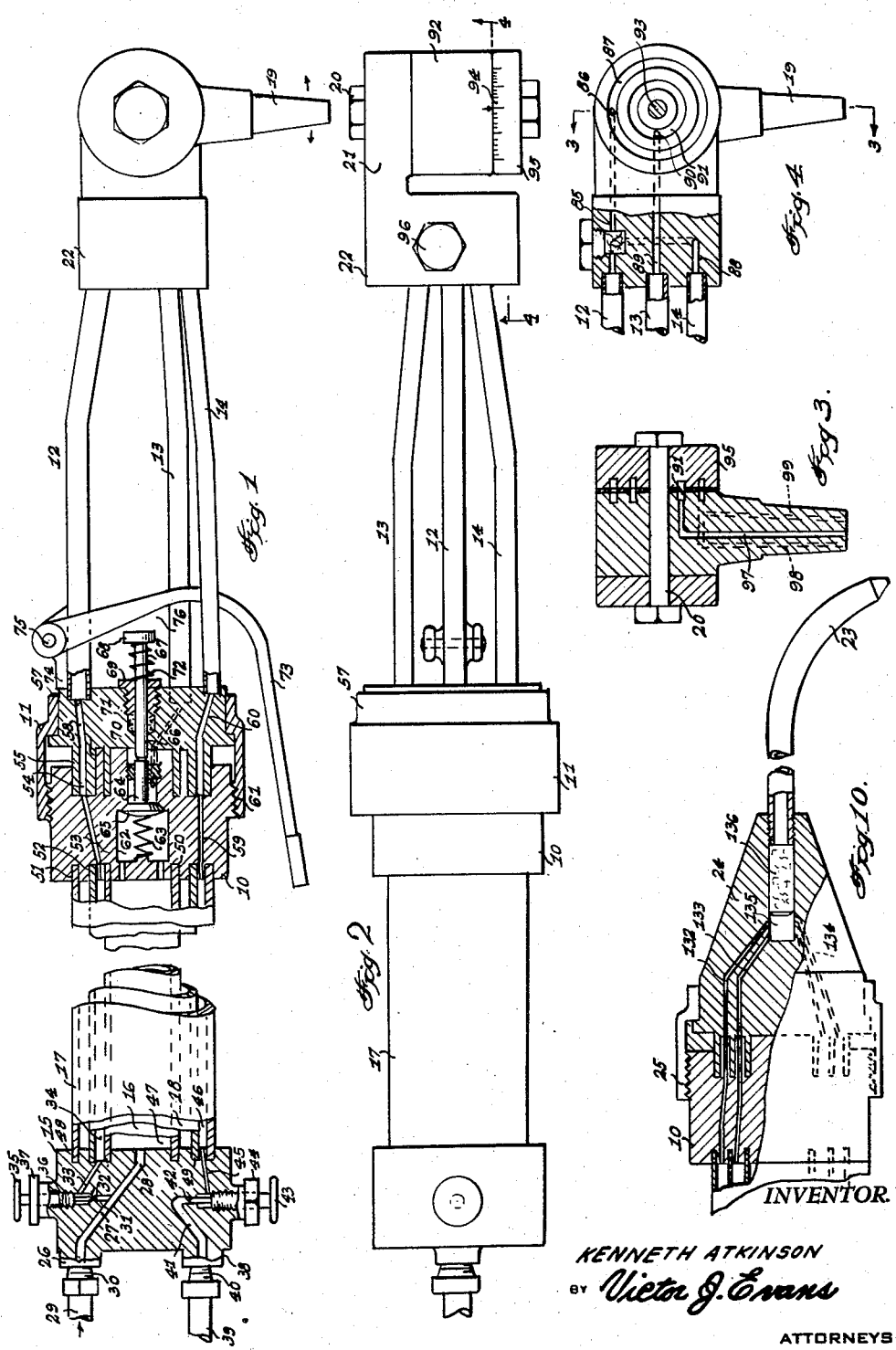
INVENTOR.
KENNETH ATKINSON
BY Victor J. Evans
ATTORNEYS May 3, 1960　　　　　K. ATKINSON　　　　　2,935,125
WELDING AND CUTTING TORCH COMBINATION
Filed May 2, 1957　　　　　　　　　　　　2 Sheets-Sheet 2
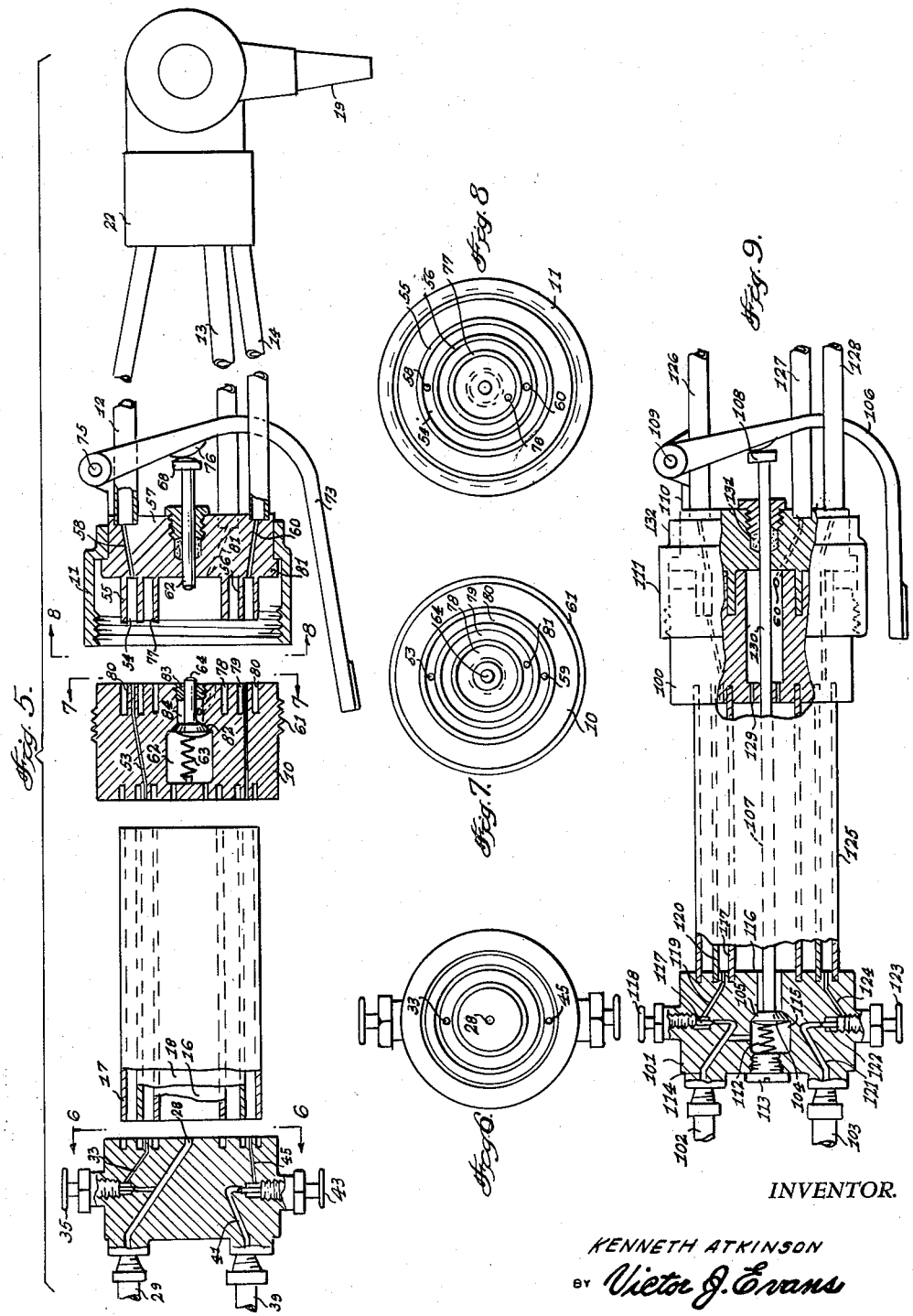
INVENTOR.
KENNETH ATKINSON
BY *Victor J. Evans*
ATTORNEYS

United States Patent Office

2,935,125
Patented May 3, 1960

2,935,125

WELDING AND CUTTING TORCH COMBINATION

Kenneth Atkinson, Hartsdale, N.Y.

Application May 2, 1957, Serial No. 656,560

1 Claim. (Cl. 158—27.4)

This invention relates to welding and cutting torches wherein oxygen and acetylene are supplied to a tip under pressure, and in particular a head having a gas supply fitting carried by a plurality of concentric tubes extended from one end and a welding or cutting tip extended from the opposite end and wherein passages with valves therein extend through the head and are positoned to, selectively, feed oxygen and acetylene to a tip for welding, or feed oxygen and acetylene, with an extra supply of oxygen fed through the center, for cutting.

The purpose of this invention is to provide a combination head for a torch wherein a conventional mixture of oxygen and acetylene are fed through the head to a welding tip and wherein with the welding tip replaced by a cutting tip or nozzle an extra supply of oxygen is fed through the head to a passage in the center of the tip to supply additional oxygen for cutting.

Various types of welding and cutting torches have been provided, however, in substantially all instances oxygen and acetylene are carried through separate channels with individual valves therein to a tip and when the torch is used for welding concentric circles of oxygen and acetylene are supplied to and discharged from the tip whereas with the device used for cutting an extra supply of oxygen is supplied through the center of the tip. Various types of valve assemblies have been provided for controlling the oxygen through the center of the tip for cutting, however, such devices have not been found successful.

With this thought in mind this invention contemplates a welding and cutting torch combination in which conventional supplies of oxygen and acetylene are supplied to the tip for welding and wherein additional oxygen is supplied to the tip for cutting by means of a lever actuated valve positioned in the head or butt.

The object of this invention is to provide an acetylene torch that may readily be converted from a welding to a cutting torch and in which oxygen supplied for cutting is controlled by a lever actuated valve in the oxygen supply line.

Another object of the invention is to provide a welding and cutitng torch combination in which the parts are substantially of the same size as corresponding parts of a conventional torch.

Another important object of the invention is to provide a welding and cutting torch combination in which additional oxygen for cutting is controlled by a manually actuated lever carried by a nut threaded on the head of the torch.

A further object of the invetnion is to provide a welding and cutting torch combination which is of a simple and economical construction.

With these and other objects and advantages in view the invention embodies a head having a nut threaded thereon with a butt on extended ends of concentric tubes extended from the head and with a tip carried by tubes extended from the nut threaded on the head in which a valve is provided in the head or butt to provide additional oxygen for cutting.

Other features and advantages of the invention will appear from the following description taken in connection with the drawings, wherein:

Figure 1 is a side elevational view of the improved welding and cutting torch with the head, nut, and butt broken away and shown in section.

Figure 2 is a plan view of the welding and cutting torch combination.

Figure 3 is a cross section through the tip at the extended end of the torch showing the tip with the nozzle or tip portion thereof extended downwardly, the section being taken on line 3—3 of Fig. 4.

Figure 4 is a longitudinal section through the tip of the torch taken on line 4—4 of Figure 2 illustrating the positions of oxygen and acetylene passages through the tip.

Figure 5 is a longitudinal section with parts shown in elevation, similar to the illustration shown in Figure 1, the parts being separated showing an exploded view.

Figure 6 is a cross section through the device taken on line 6—6 of Figure 5 showing the connecting openings or recesses in the inner face of the butt.

Figure 7 is a cross section through the torch taken on line 7—7 of Figure 5 showing the annular recesses, corresponding with the recesses if the face of the butt and in which ends of the concentric tubes are positioned.

Figure 8 is a cross section through the torch taken on line 8—8 of Fig. 5 showing the relative positions of the concentric annular recesses and openings communicating with the tubes extended through the tip.

Figure 9 is a longitudinal section through the torch with parts broken away and parts shown in elevation illustrating a modification wherein the valve positioned in the head of the desgn shown in Figure 1 is positioned in the butt.

Figure 10 is a longitudinal section through the head and part of a connecting element showing a welding tip secured to the head.

Referring now to the drawings wherein like reference characters denote corresponding parts the improved welding and cutting torch combination of this invention includes a head 10 having a nut 11 in which tubes 12, 13, and 14 are mounted threaded thereon, a butt 15 carried by an inner tube 16, an outer tube 17 and an intermediate tube 18 extended from the head 10, a cutting tip 19 secured by a bolt 20 on an arm 21 extended from a base 22 which is mounted on extended ends of the tubes 12, 13, and 14, and a welding tip 23 extended from a bushing 24 which is connected by a nut 25, similar to the nut 11, to the head 10.

The butt 15 is provided with a connection 26 for supplying oxygen through a passage 27 to a center opening 28 and oxygen is supplied through the connection by a tube 29 having a nipple 30 threaded into the connection 26. The passage 27 is provided with a branch connection 31 through which oxygen is supplied through a valve 32 to a connection 33 that extends to an annular area 34 between the tubes 16 and 18. The valve 32 is controlled by a knob 35 on the end of a valve stem 36 that extends through a packing gland 37. The valve 32 is opened and closed by the knob 35.

The butt 15 is also provided with a connection 38 to which a tube 39 for supplying acetylene to the torch is connected by a threaded nipple 40 and a passage 41 extends from the connection 38 to a valve 42 which is actuated by a knob 43 that is threaded through a packing gland 44 and a passage 45 extends from the valve 42 to an area 46 between the intermediate tube 18 and the outer tube 17.

The ends of the tubes 16, 17, and 18 are positioned in annular recesses 47, 48, and 49 and the opposite ends of the tubes are secured in similar annular recesses 50, 51, and 52 at one end of the head 10.

The head 10 is provided with a passage 53 extended from the area 34 between the tubes 16 and 18 to an annular passage 54 between circular flanges 55 and 56 extended from the wall 57 of the nut 11, the area 54 being connected by a passage 58 to the tube 12 which extends to the base 22 of the tip 19.

The head 10 is also provided with a passage 59 that extends from the area 46 between the tubes 17 and 18 through the area between the flanges 55 and 56 and through an additional passage 60 to the tube 14 which also extends to the base 22.

The head 10 is also provided with a threaded section 61 upon which the nut 11 is threaded, as shown in Fig. 1.

The head 10 is formed with a cavity 62 in which a spring 63 is positioned and a stem 64 of a valve 65 extends through a bore 66 through which the stem 64 extends and the stem 64 is positioned to engage the inner end of a stem 67 on the outer end of which a head 68 is positioned. A packing nut 69 is threaded in a bore 70 on the wall 57 of the nut 11 and a packing gland 71 is provided at the end of the packing nut. A spring 72, positioned around the stem 67 urges the head 68 and stem 67 outwardly permitting the valve to be closed by the spring 63.

The stem 67 is actuated by a hand lever 73 pivotally mounted by a lug 74 extended from the nut 11 with a pin 75 and as the lever is moved inwardly by hand an enlarged portion 76, bearing against the head 68 of the stem 67 urges the stem inwardly, sliding the valve stem 64 against the spring 63 and opening the valve 65. With the valve open oxygen for cutting is admitted from the passage 27 through inner tube 16, valve 65 and passage 76 to the tube 13.

The torch may be used for welding with the valve 65 closed whereas conventional oxygen and acetylene pass through the tip and when it is desired to use the device for cutting the lever 73 is pressed inwardly opening the valve 65 whereby a supply of oxygen is supplied to the center of the tip as is required for cutting.

The inner surface of the plate 57 of the nut 11 is also provided with a circular flange 77 that extends into a recess 78 in the head 10 with the circular flange 56 in a circular recess 79 and with the circular flange 55 in a circular recess 80 of the head.

The valve 65 is urged against the valve seat 82 by the spring 63 and the stem 64 of the valve is slidably mounted in a bushing 83 threaded in a bore 84 of the head.

The tip 19 is conventional with a passage 85 extended from the tube 12 to an orifice 86 in a groove 87 and with a passage 88 extended from the tube 14 to the passage 85. The tip mounting is also provided with a passage 89 that extends from the tube 13 to an orifice 90 in an annular groove 91 and with corresponding annular grooves in a section 92 from which the tip 19 extends oxygen and acetylene may be supplied to the tip for welding and heating and additional oxygen may be supplied to the center opening 93 for cutting.

With the tip formed as illustrated in Figs. 2 and 4 the tip may be set by the vernier scale 94 on a disc 95 thereof whereby the torch will cut at any desired angle, such as an angle of 60 or 45° thereby providing a beveled edge on a piece of material being cut. The parts are secured in assembled relation by the bolt 20 and a drain plug 96 may be provided in the base 22 to drain foreign matter from the tip.

As illustrated in Fig. 3 the bolt 20 extends through the tip, being positioned in an opening 93 and the annular recess 91 is in communication with a center opening 97 and the annular recess 87 in communication with passages 98 and 99.

In the design illustrated in Fig. 9 the valve 65 is moved from the head 100, similar to the head 10 to the butt 101 and it will be understood that the valve may be positioned in the head or butt or at any suitable point.

In Fig. 9 the butt 101 is provided with an oxygen supply connection 102 and an acetylene supply connection 103 and a valve 104 positioned to coact with a seat 105 is provided in the intermediate part of the butt, the valve being actuated by a hand lever 106, similar to the lever 73, through an extended rod 107 on the extended end of which the head 108 is provided. The hand lever 106 is pivotally mounted by a pin 109 on a lug 110 extended from the nut 111 of the head 100. The valve is urged to the closed position by a spring 112 positioned with one end against the valve 104 and with the opposite end retained in position by a plug 113 threaded in the end of the butt.

The oxygen supply connection 102 is connected by a passage 114 to a cavity 115 in which the spring 112 and valve 104 are positioned and with the valve open the oxygen passes through a bore 116 to the inner tube 117 which extends between the butt 101 and the head 100.

The passage 114 also extends to a valve 117 that is actuated to open and closed positions by a button 118 and the valve is provided with an outlet passage 119 that extends to an area between the tube 117 and an intermediate tube 120.

A passage 121 extends from the acetylene connection 103 to a valve 122 and from the valve 122 which is actuated by a button 123 a passage 124 extends to an area between the tube 120 and the outer tube 125.

The head 100, in which the opposite ends of the tubes 117, 120, and 125 are positioned is otherwise similar to the head 10 with the passage between the concentric tubes communicating with the tubes 126, 127, and 128, which extend to the welding or cutting tip. The rod 107 extends through a bushing 129 and to a bore 130 in the head and, also through a packing gland 131 in the plate 132 of the nut 111.

The design illustrated in Fig. 9 may also be used as a welding torch or as a cutting torch by opening the valve 104, or as may be desired.

In the design illustrated in Fig. 10 a welding tip 23, mounted in a bushing 24 is secured by a nut 25 to the head 10 with oxygen passing through passages 132 and 133 to the tip 23 and with acetylene passing through the passage 134 to the tip.

Also as illustrated in Fig. 10 a mixing chamber 135 into which oxygen and acetylene are supplied is provided with a porous metal filter or element 136 which assures thorough mixing of the oxygen and acetylene thereby providing an improved welding or cutting flame.

In using porous metal mixing elements back lashing resulting from oxygen flow through a torch or tip is substantially eliminated.

Furthermore, the multiple angle cutting tip makes it possible for the operator to cut a bevel of any desired angle and a bevel may also be cut on any suitable radius.

The proportions of oxygen and acetylene supplied to the welding or cutting torch are controlled by the valves 32 and 42 which are adjusted by the knobs 35 and 43.

It will be understood that modifications, within the scope of the appended claim, may be made in the design and arrangement of the parts without departing from the spirit of the invention.

What is claimed is:

In a welding and cutting torch, the combination which comprises a butt having oxygen and acetylene connections is one end and concentric inner, intermediate, and outer recesses in the opposite end, said butt having an oxygen passage extended from the oxygen connection to the area within the center recess and a by-pass from the oxygen passage to the area between the inner and intermediate recesses, a valve in said by-pass, said valve having a stem with a knob on the outer end extended from one side of the butt, and said butt having a passage from the acetylene connection to an area between the intermediate and outer recesses, a valve in the passage from the acetylene connection to the area between the intermediate and outer recesses, a stem having a knob on the outer end extending from said valve through the butt for manual operation of the valve, a head having concentric inner, intermediate and outer recesses in one end spaced from the butt, the recesses being similar to corresponding recesses in the butt, inner, intermediate and outer tubes extended between the butt and the head and positioned with the ends thereof in the recesses of said butt and head, a tip having center and intermediate passages extended therethrough, tubes extended between the head and tip and positioned with a center tube in communication with a center passage of the tip at one end, and with the area within the inner tube at the opposite end, an outer tube also extended between the head and tip and positioned whereby one end is in communication with intermediate passages of the tip and the other with the area of the head between the inner and intermediate tubes, another tube extended between the head and tip and positioned with the outer end in communication with some of the intermediate passages of the tip and with the opposite end in communication with the area between the intermediate and outer tubes at the opposite end of the head, a valve in the head and positioned in the passage to the tube in communication with the area within the center tube, a stem extended from said valve, resilient means for actuating the stem to permit the valve to close, resilient means for urging the valve to the closed position, and a hand lever pivotally mounted in combination with the head and positioned to engage the valve stem of the valve in the passage to the center tube for manually actuating the said valve to an open position.

References Cited in the file of this patent

UNITED STATES PATENTS

| | | |
|---|---|---|
| 1,162,199 | Winans et al. | Nov. 30, 1915 |
| 1,222,319 | Mueller | Apr. 10, 1917 |
| 1,284,085 | Fort | Nov. 5, 1918 |
| 1,361,667 | Baudet | Dec. 7, 1920 |
| 1,980,636 | Roumillat | Nov. 13, 1934 |
| 2,108,819 | Jacobsson | Feb. 22, 1938 |
| 2,535,873 | Smith | Dec. 26, 1950 |
| 2,645,277 | Richter | July 14, 1953 |